United States Patent
He et al.

(10) Patent No.: US 10,813,068 B2
(45) Date of Patent: Oct. 20, 2020

(54) SYSTEMS, METHODS, AND DEVICES FOR SYNCHRONIZATION SOURCE SELECTION FOR DEVICE-TO-DEVICE COMMUNICATION

(71) Applicant: Apple Inc., Cupertino, CA (US)

(72) Inventors: Hong He, Beijing (CN); Alexey Khoryaev, Niz (RU); Debdeep Chatterjee, Santa Clara, CA (US); Mikhail Shilov, Niz (RU); Pingping Zong, Randolph, NJ (US)

(73) Assignee: APPLE INC., Cupertino, CA (US)

( * ) Notice: Subject to any disclaimer, the term of this patent is extended or adjusted under 35 U.S.C. 154(b) by 43 days.

(21) Appl. No.: 14/582,580

(22) Filed: Dec. 24, 2014

(65) Prior Publication Data
US 2015/0327201 A1    Nov. 12, 2015

Related U.S. Application Data

(60) Provisional application No. 61/990,615, filed on May 8, 2014.

(51) Int. Cl.
*H04W 56/00* (2009.01)
*H04W 24/10* (2009.01)
(Continued)

(52) U.S. Cl.
CPC ....... *H04W 56/0025* (2013.01); *H04W 8/005* (2013.01); *H04W 24/10* (2013.01);
(Continued)

(58) Field of Classification Search
CPC ............. H04W 56/0015; H04W 24/10; H04W 56/0025
See application file for complete search history.

(56) References Cited

U.S. PATENT DOCUMENTS

| 8,817,702 B2 | 8/2014 | Palanki et al. |
| 2010/0135176 A1 | 6/2010 | Kazmi et al. |

(Continued)

FOREIGN PATENT DOCUMENTS

| JP | 2009528708 A | 8/2009 |
| JP | 2010233082 A | 10/2010 |

(Continued)

OTHER PUBLICATIONS

Institute for Information Industry (III), "Performance of D2D synchronization source selection and D2DSS transmission", R1-141498, 3GPP TSG-RAN WG1 Meeting #76bis, Shenzhen, China, Mar. 31-Apr. 4, 2014, 5 pages.

(Continued)

*Primary Examiner* — Charles C Jiang
*Assistant Examiner* — Voster Preval
(74) *Attorney, Agent, or Firm* — Stoel Rives LLP (57) ABSTRACT

A user equipment (UE) is configured to scan for device-to-device synchronization sources based on scanning configuration information. The UE is configured to report detection of a device-to-device synchronization source to an Evolved Universal Terrestrial Radio Access Network (E-UTRAN) Node B (eNB) in response to determining that the device-to-device synchronization source meets one or more reporting requirements of the scanning configuration information. The UE is configured to receive a communication from the eNB enabling the UE as a synchronization source and transmit signals to provide a synchronization reference to one or more in-range UEs including the device-to-device synchronization source.

22 Claims, 6 Drawing Sheets

(51) Int. Cl.
*H04W 8/00* (2009.01)
*H04W 48/16* (2009.01)
*H04W 76/14* (2018.01)

(52) U.S. Cl.
CPC ....... *H04W 48/16* (2013.01); *H04W 56/0015* (2013.01); *H04W 76/14* (2018.02)

(56) References Cited

U.S. PATENT DOCUMENTS

| | | | |
|---|---|---|---|
| 2011/0170465 | A1 | 7/2011 | Tavildar et al. |
| 2011/0182280 | A1 | 7/2011 | Charbit et al. |
| 2012/0163278 | A1 | 6/2012 | Chang et al. |
| 2012/0182962 | A1 | 7/2012 | Patil et al. |
| 2012/0307698 | A1 | 12/2012 | Tavildar et al. |
| 2013/0077512 | A1 | 3/2013 | Chang et al. |
| 2013/0083779 | A1 | 4/2013 | Ahn et al. |
| 2014/0098761 | A1 | 4/2014 | Lee et al. |
| 2014/0112194 | A1 | 4/2014 | Novlan et al. |
| 2014/0213221 | A1* | 7/2014 | Chai ............... H04W 72/0493 455/411 |
| 2014/0376458 | A1* | 12/2014 | Ryu ............... H04W 52/383 370/329 |
| 2015/0215883 | A1* | 7/2015 | Zheng ............... H04W 56/0015 455/426.1 |
| 2015/0264588 | A1* | 9/2015 | Li ............... H04W 56/0015 370/350 |
| 2015/0319745 | A1 | 11/2015 | Seo et al. |
| 2016/0021581 | A1* | 1/2016 | Deenoo ............ H04W 36/0069 370/331 |
| 2016/0050702 | A1* | 2/2016 | Sorrentino ............ H04W 8/005 370/329 |
| 2016/0227495 | A1* | 8/2016 | Lee ............... H04W 72/04 |
| 2016/0255515 | A1* | 9/2016 | Lindoff ............ H04W 74/0833 370/252 |
| 2017/0013575 | A1* | 1/2017 | Jung ............... H04L 47/29 |
| 2017/0013595 | A1* | 1/2017 | Jung ............... H04W 72/02 |
| 2017/0041894 | A1* | 2/2017 | Lee ............... H04W 72/04 |
| 2017/0064733 | A1* | 3/2017 | Lee ............... H04W 72/1278 |

FOREIGN PATENT DOCUMENTS

| | | |
|---|---|---|
| KR | 1020130029355 | 3/2013 |
| KR | 1020130118954 | 10/2013 |
| RU | 2510583 C2 | 4/2013 |
| RU | 2503150 C2 | 8/2013 |
| WO | 2007102565 A1 | 9/2007 |
| WO | 2010107216 A2 | 9/2010 |
| WO | 2013123961 A1 | 8/2013 |
| WO | 2013177447 A | 11/2013 |
| WO | 2013177447 A1 | 11/2013 |
| WO | 2014050887 A1 | 4/2014 |
| WO | 2014062035 A1 | 4/2014 |
| WO | 2014085143 A1 | 6/2014 |

OTHER PUBLICATIONS

Intel Corporation, "Discussion on Out of Coverage Definition", R1-141547, 3GPP TSG RAN WG1 Meeting #76bis, Shenzhen, China, Mar. 31-Apr. 4, 2014, 3 pages.
PCT/US2015/025387, International Search Report and Written Opinion, dated Jul. 21, 2015, 13 pages.
Qualcomm Incorporated, et al., "WF on D2D Synchronization Source", R1-141814, 3GPP TSG RAN WG1 #76BIS, Shenzhen, China, Mar. 31-Apr. 4, 2014, 2 pages.
Samsung, "Signal and Channel Design for Synchronization Source Selection", R1-141312, 3GPP TSG RAN WG1 #76bis, Shenzhen, P.R. China, Mar. 31-Apr. 4, 2014, 4 pages.
Intel Corporation, "Discussion on D2D broadcase resource allocation", R1-140130, 3GPP TSG RAN WG1 Meeting #76, Prague, Czech Republic, Agenda Item 7.2.8.1.3, Feb. 10-14, 2013, 7 pages.
Intel Corporation, "Discussion on D2D Synchronization", R1-135113, 3GPP TSG RAN WG1 Meeting #75, San Francisco, California, USA, Agenda Item 6.2.8.1.1, Nov. 11-15, 2013, 7 pages.
Intel Corporation, "Discussion on D2D synchronization procedure", R1-140127, 3GPP TSG RAN WG1 Meeting #76, Prague, Czech Republic, Agenda Item 7.2.8.1.1, Feb. 10-14, 2014, 7 pages.
Intel Corporation, "Preliminary performance analysis of D2D synchronization", R1-135114, 3GPP TSG RAN WG1 Meeting #75, San Francisco, California, USA, Agenda Item 6.2.8.1.1, Nov. 11-15, 2013, 8 pages.
HTC, "D2D transmission timing considerations", R1-135670, 3GPP TSG RAN WG1 Meeting #75, San Francisco, United States, Agenda Item 6.2.8.3, Nov. 11-15, 2013, 2 pages.
PCT/US2015/013789, International Search Report and Written Opinion, dated Apr. 30, 2015, 11 pages.
PCT/US2015/013789, Notification Concerning Transmittal of International Preliminary Report on Patentability, dated Aug. 11, 2016, 10 pages.
Samsung, "D2D Synchronization Signal relay by UE", R1-141314, 3GPP TSG RAN WG1 Meeting #76bis, Shenzhen, China, Agenda Item 7.2.7.3.3, Mar. 31-Apr. 4, 2014, 3 pages.
U.S. Appl. No. 15/032,078, Non-Final Office Action, dated Nov. 7, 2017, 11 pages.
U.S. Appl. No. 15/032,078, Final Office Action, dated Aug. 28, 2018, 12 pages.
Catt, "Discussion on D2D synchronization procedure", R1-141198, 3GPP TSG RAN WG1 Meeting #76bis, Shenzhen, China, Agenda Item 7.2.7.3.3, Mar. 31-Apr. 4, 2014, 6 pages.
U.S. Appl. No. 15/032,078, Final Office Action, dated May 3, 2018, 13 pages.
U.S. Appl. No. 15/032,078, Final Office Action, dated Feb. 14, 2019, 13 pages.
3GPP TR 36.843, "3rd Generation Partnership Project; Technical Specification Group Radio Access Network; Study on LTE Device to Device Proximity Services; Radio Aspects (Release 12)", V1.2.0, Feb. 2014, 49 pages.
Ericsson, "Synchronization Signals and Channel Design for D2D Discovery and Communication", R1-140774, 3GPP TSG RAN WG1 Meeting #76, Prague, Czech Republic, Agenda Item 7.2.8.1.1, Feb. 10-14, 2014, 7 pages.
Qualcomm Incorporated, "Discussion on Public Safety UE-Network Relays", R1-134805, 3GPP TSG-RAN WG1 #74bis, Guangzhou, China, Agenda Item 5, Oct. 7-11, 2013, 3 pages.
U.S. Appl. No. 15/032,078, Non-Final Office Action, dated Aug. 8, 2019, 16 pages.

\* cited by examiner

SYSTEMS, METHODS, AND DEVICES FOR SYNCHRONIZATION SOURCE SELECTION FOR DEVICE-TO-DEVICE COMMUNICATION

RELATED APPLICATION

This application claims the benefit under 35 U.S.C. § 119(e) of U.S. Provisional Application No. 61/990,615, filed May 8, 2014, which is hereby incorporated by reference herein in its entirety.

TECHNICAL FIELD

The present disclosure relates to device-to-device communication and more particularly relates to synchronization source selection for device-to-device communication.

DETAILED DESCRIPTION OF PREFERRED EMBODIMENTS

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile communication device). Some wireless devices communicate using orthogonal frequency division multiple access (OFDMA) in a downlink (DL) transmission and single carrier frequency division multiple access (SC-FDMA) in an uplink (UL) transmission. Standards and protocols that use orthogonal frequency division multiplexing (OFDM) for signal transmission include the 3rd Generation Partnership Project (3GPP) long term evolution (LTE) Rel. 8, 9 and 10; the Institute of Electrical and Electronics Engineers (IEEE) 802.16 standard (e.g., 802.16e, 802.16m), which is commonly known to industry groups as WiMAX (Worldwide interoperability for Microwave Access); and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The DL transmission may be a communication from the node (e.g., eNB) to the wireless device (e.g., UE), and the UL transmission may be a communication from the wireless device to the node.

Proximity-based applications and proximity services (ProSe) represent an emerging social-technological trend. Proximity-based communication, which are also referred to herein as device-to-device (D2D) or peer-to-peer services or communication, is a powerful technique for increasing network throughput by enabling direct communications between mobile stations rather than using network infrastructure, and has a wide variety of applications. For example, D2D has been proposed for local social networks, content sharing, location-based marketing, service advertisements, public safety networks, mobile-to-mobile applications, and other services. D2D communications are of interest due to their ability to reduce load on a core network or a RAN, increase data rates due to direct and short communication paths, provide public safety communication paths, and provide other functionality. The introduction of a ProSe capability in LTE would allow the 3GPP industry to serve this developing market, and, at the same time, serve the urgent needs of several public safety services. This combined use may enable economy of scale advantages because the resulting system may be used for both public safety and non-public-safety services, where possible.

There are various alternatives to realize such a direct communication path between mobile devices. In one embodiment, the D2D air interface PC5 (i.e., interface for D2D communication) could be realized by some type of short-range technology, such as Bluetooth or Wi-Fi, or by reusing licensed LTE spectrum, such as a UL spectrum in frequency division duplex (FDD) system and UL subframes in time division duplex (TDD) system. Furthermore, D2D communications can be generally divided into two parts. The first part is device discovery, whereby UEs are able to determine that they are within range and/or available for D2D communication. Proximity detection may be assisted by network infrastructure, may be performed at least partially by the, and/or may be performed largely independent of the network infrastructure. The second part is direct communication, or D2D data communication, between UEs, which includes a process to establish a D2D session between UEs as well as the actual communication of user or application data. D2D communication may or may not be under continuous control of a mobile network operator (MNO). For example, the UEs may not need to have an active connection with an eNB in order to take part in D2D communications. It should be noted that D2D communication (i.e., the second part) can be implemented and operated by D2D capable UEs independently without support of D2D discovery (i.e., the first part).

Figure 1A:
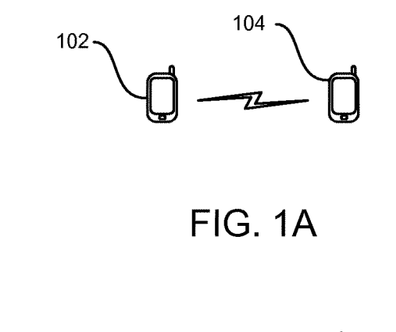
FIG. 1A is a schematic diagram illustrating an example out-of-coverage scenario for device-to-device communication.
Figure 1B:
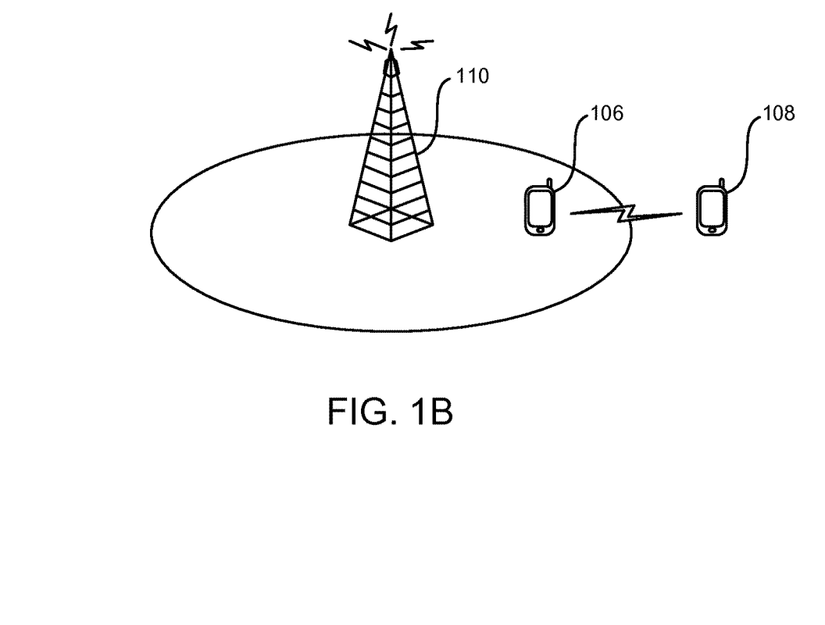
FIG. 1B is a schematic diagram illustrating an example partial network coverage scenario for device-to-device communication.
Figure 1C:
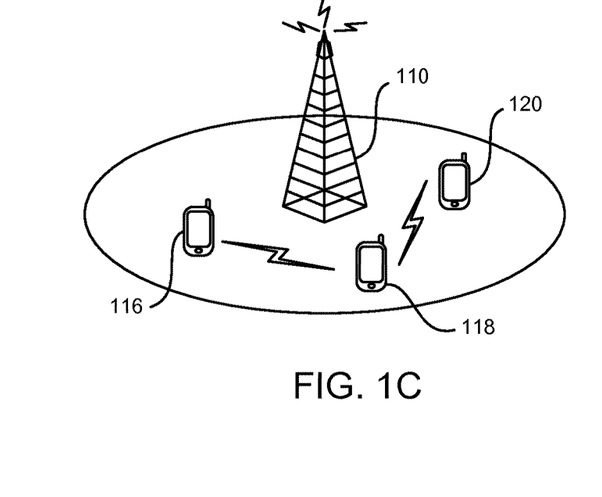
FIG. 1C is a schematic diagram illustrating an example in-coverage scenario for device-to-device communication.
Figure 1D:
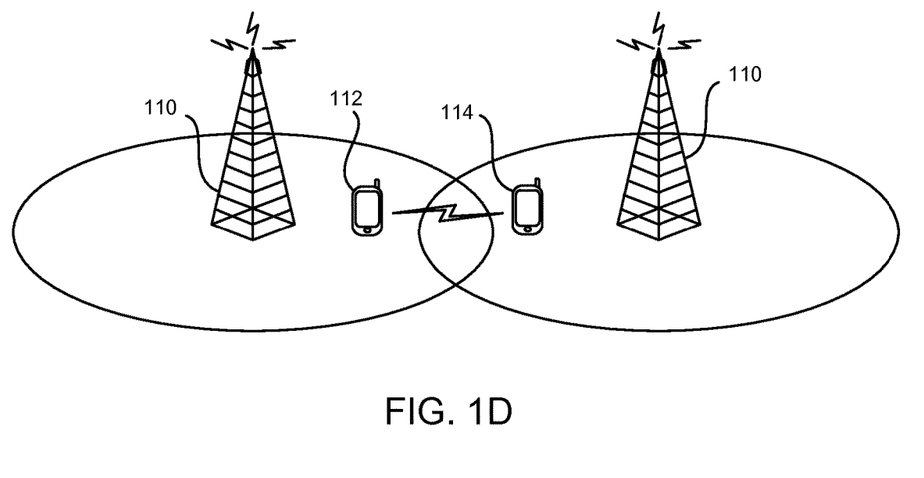
FIG. 1D is a schematic diagram illustrating an inter-cell coverage scenario for device-to-device communication.

In general, three different deployment scenarios need to be supported for D2D communication, including in-network coverage, partial network coverage, and out-of-network coverage. FIG. 1A illustrates an out-of-network coverage scenario where UE 102 is in direction communication with UE 104. The UEs 102-104 are out-of-coverage of an eNB or are not capable of direct communication with an eNB. FIG. 1B illustrates a partial network coverage scenario where UE 106 is within coverage of an eNB 110 and in communication with UE 108 that is not within coverage of any eNB 110. FIG. 1C illustrates an in-network coverage scenario with a plurality of UEs 116-120 which are all in network coverage and in D2D communication with each other. FIG. 1D illustrates a UE 112 that is within coverage of a first eNB 110 that is in D2D communication with UE 114 that is within coverage of a second eNB 110.

One of common essential issues applicable to D2D communication in each of the above scenarios is how to design a synchronization protocol in order to enable D2D UE to synchronize to other UEs to achieve time and frequency synchronization for D2D communication. For in-network coverage scenarios, the synchronization procedure is reasonably straightforward. According to agreement by the LTE RAN1 working group, synchronization sources that are eNBs have higher priority over synchronization sources which are D2D UEs, and hence all D2D enabled UEs in coverage will connect to the serving cell and derive the synchronization information based on a detected primary synchronization signal (PSS) or secondary synchronization source (SSS). However, the situation becomes a bit more complicated for partial network coverage and out-of-network coverage scenarios, and how to design the synchronization procedure for these cases to achieve the design target of synchronous D2D communication is still an open problem.

In some embodiments, the present disclosure addresses synchronization procedures for scenarios when UEs are within different coverage areas, such as the scenarios of FIGS. 1B and 1D. For example, when UEs are within different coverage areas (i.e., different cells or one UE is out of coverage) the UEs may be out of synchronization. In one embodiment, an eNB may designate UEs at coverage border area to transmit D2D synchronization signals (D2DSSs) according to a reference signal received power (RSRP) report. In some embodiment, this may be undesirable due to unnecessary transmission of D2DSS(s) which may thereby increasing UE power consumption as well as reducing usage efficiency or wireless spectrum resources.

Figure 2:
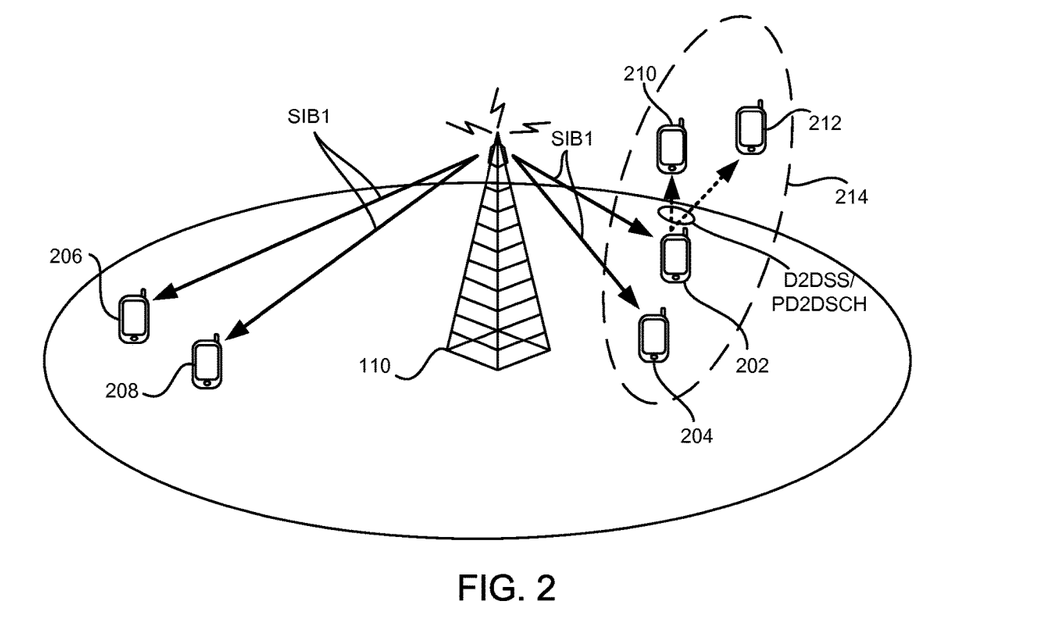
FIG. 2 is a schematic block diagram illustrating device-to-device synchronization in a partial coverage scenario according to one embodiment.
Figure 3:
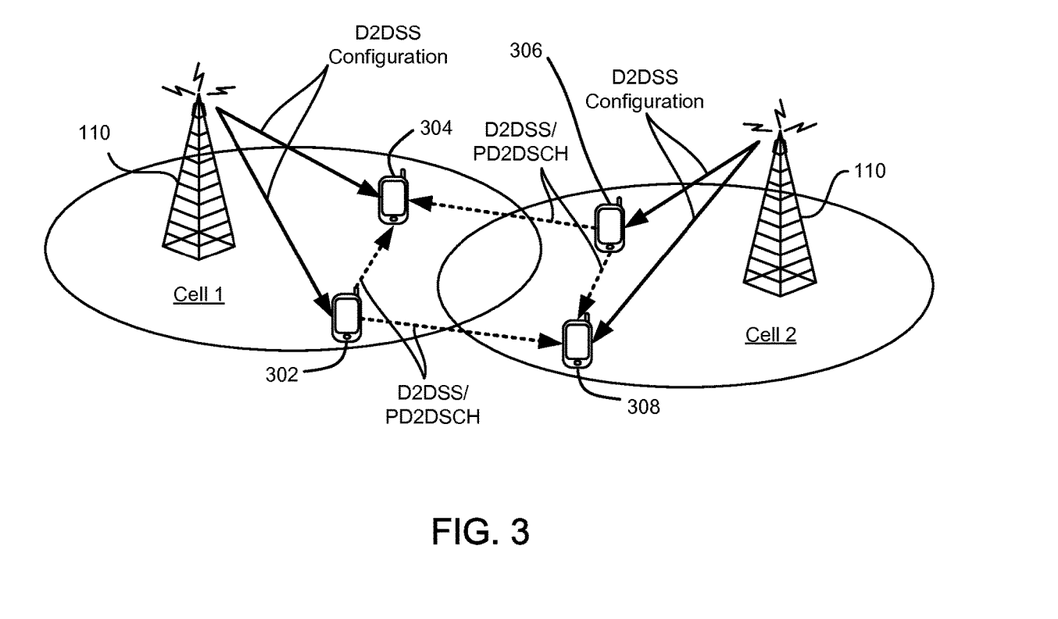
FIG. 3 is a schematic block diagram illustrating device-to-device synchronization in an inter-cell coverage scenario according to one embodiment.

The present application discloses synchronization procedures with details on related network and UE behaviors such as how to select synchronization sources that are within in-coverage. FIGS. 2 and 3 illustrate example operation according to example embodiments. FIG. 2 illustrates a synchronization procedure for a partial network scenario with a plurality of in-coverage UEs 202-208 and a plurality of out-of-coverage UEs 210-212. UEs 202, 204, 210, and 212 are shown as part of a D2D cluster 214. In one embodiment, UE 202 is selected as a synchronization source and transmits D2DSS and physical device-to-device shared channel (PD2DSCH) messages with synchronization information. UEs 210 and 212 receive the synchronization information to fall in synch with the UEs 202 and 204 as well as the eNB 110. FIG. 3 illustrates a synchronization procedure for an inter-cell D2D communication scenario with UEs 302, 304 within a cell 1 coverage area and UEs 306, 308 within a cell 2 coverage area. Specifically, UE 302 may be selected as a synchronization source and propagates timing information of cell 1 using D2DSS or PD2DSCH. Similarly, UE 306 may be selected as a synchronization source in cell 2 and propagates timing information of cell 2 using D2DSS or PD2DSCH.

In one embodiment, a synchronization source (e.g., UE 302 of FIG. 3 and UE 202 of FIG. 2) might also forward the eNB-originated resource pool configuration via PD2DSCH to UEs out of network coverage (e.g., UE2 and UE3) or that of neighbor cells after decoding a System Information Block Type 1 (SIB1) message. Furthermore, one design objective may include minimizing the number of synchronization nodes without sacrificing D2D communication performance. For example, having a minimal number of SS nodes is desirable to reduce the signaling overhead as well as to minimize the UE power consumption. In one embodiment, each eNB 110 may explicitly configure a UE as a synchronization source via dedicated RRC signaling to limit a number of UEs that are sending synchronization information. In another embodiment, UEs may autonomously decide when to act as a synchronization source based on preconfigured criteria, such as criteria defined in a 3GPP standard or by an eNB 110.

This application presents two general approaches: a reactive scheme and a proactive scheme. In the reactive scheme, the network controls the selection and reselection of UEs as synchronization sources. For example, the network (i.e., an eNB 110) decides which D2D UEs, which are in-coverage, will transmit synchronization signals in a periodical manner. In one embodiment, one UE in network coverage conditionally requests that the network configure it to act as a synchronization source for D2DSS transmission. For example, the UE may request configuration as a synchronization source in response to detecting a D2DSS with timing information not originating from a UE-camped eNB. As another example, the UE may request configuration as a synchronization source for UEs that do not have an eNB-UE interface and can communicate only through a direct link. Note that in future LTE releases a new UE category can be introduced that may not support eNB-UE air interface but supports a UE-UE interface, such as D2D interfaces via an unlicensed spectrum, such as WiFi, or a licensed spectrum, such as a spectrum of a 3GPP LTE network. This new category of devices may benefit from reduced complexity, low power consumption, and low cost.

One example of when a reactive scheme may be used is detection of independent synchronization sources. The scheme may include either muting of their operation or alignment of their timing with the network. The presence of independent synchronization sources (I-SS) may first be detected by other D2D capable UEs (e.g., UEs in a RRC_IDLE mode) that do periodic scanning for synchronization sources. In one embodiment, a single scanning interval is larger than or equal to a D2DSS period plus scanning switching time. The D2D capable UEs propagating eNB timing can force the I-SS to cease its asynchronous operation, if an appropriate rule is defined. For instance, there may be a rule that I-SS shall cease D2DSS transmission if a gateway synchronization source (G-SS) with a predefined stratum level is detected. In this case, the in-coverage UE (that detected the I-SS) may become G-SS and start to periodically transmit D2DSS using the eNB timing and thereby trigger a synchronization source reselection procedure at the I-SS. This reactive approach may require allocation of UE or cell-specific time scanning intervals. Depending on the network settings, UEs may autonomously take the G-SS role and start periodical transmission of D2DSS signals on the pre-allocated synchronization resource. Alternatively, UEs may report I-SS detection to the eNB and follow eNB instructions to initiate D2DSS periodical transmission. It should be noted that reporting of I-SS detection may trigger multiple UEs to report the same I-SS to the same eNB, for example, if multiple UEs detect I-SS simultaneously. In order to avoid such situation, the UE-specific time scanning intervals may be assigned to reduce probability of simultaneous I-SS detection by different UEs. In one embodiment, an eNB may configure one or more specific UEs (or other transmitters) to transmit D2DSS once the one or more specific UEs report detection of the I-SS and/or provide a scheduling request for direct communication.

Figure 4:
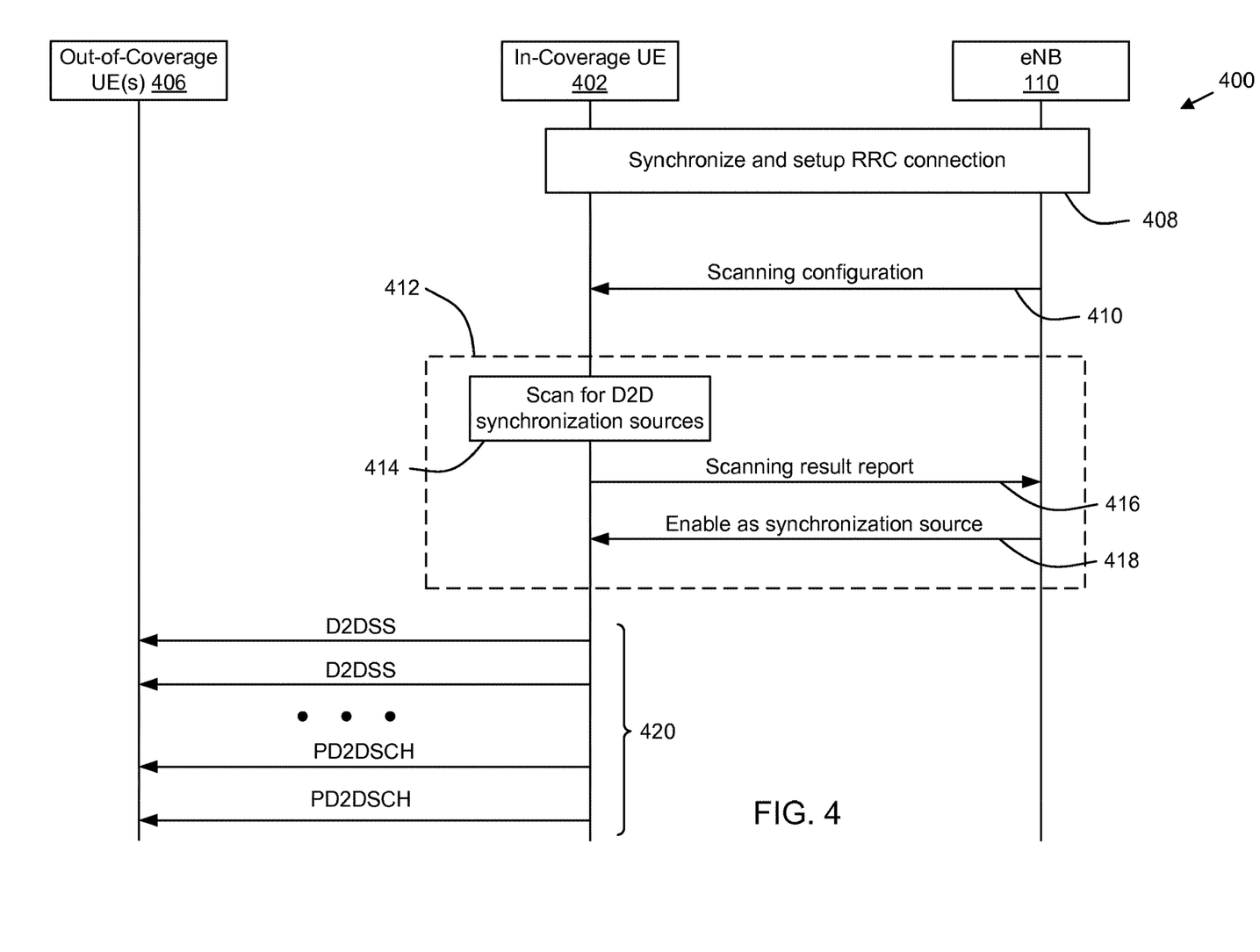
FIG. 4 is a schematic flow chart diagram illustrating a method for D device-to-device 2D synchronization according to a reactive approach, according to one embodiment.

FIG. 4 illustrates an example communication flow of a method 400 for an eNB-controlled reactive synchronization source enabling scheme. In one embodiment, an in-coverage UE 402 and corresponding eNB 110 may communicate and/or perform operations in the described manner to either mute or synchronize with out-of-coverage UEs 406. The out-of-coverage UEs 406 may include UEs that are within coverage of a different eNB, are not connected to another eNB or cell, or are not capable of communicating with an eNB using an eNB-UE interface.

The method 400 begins and, at time period 408, the in-coverage UE 402 synchronizes with the eNB 110 and an RRC connection is set up. For example, the in-coverage UE 402 may acquire synchronization to the eNB 110 in response to a cell search procedure and may establish a radio resource control (RRC) connection with D2D capable eNB by performing a random access procedure. The in-coverage UE 402 is camped on the chosen cell in response to time period 408.

At time period 410, the eNB provides scanning configuration information to the in-coverage UE 402. This may occur, for example, in response to D2D communication capability information for the in-coverage UE 402 being transferred to the eNB 110. The scanning configuration information may indicate when the in-coverage UE 402 should scan for synchronization sources and/or when a report should be send to the eNB 110. For example, the scanning configuration information may be applicable for the in-coverage UE 402 when the in-coverage UE 402 is in RRC_Connected mode. Although scanning configuration information is shown as explicitly indicated by the eNB 110, a portion or all of the scanning configuration information may be built into a standard such that it is not necessary to explicit all or a portion of the scanning configuration information.

In one embodiment, the scanning configuration information may include reporting criterion that triggers the in-coverage UE 402 to send a scanning report. Sending a scanning report may be either periodical or a single event. A plurality of embodiments for event-triggered reporting criteria is provided herein. In the first alternative, a plurality of sub-conditions may need to be met in order for the in-coverage UE 402 to send a scanning report. The first condition may include that at least one D2DSS is detected. Specifically, the detected D2DSS may need to be transmitted by either a UE that is outside coverage of the eNB 110 (e.g., see UEs 210, 212 of FIG. 2) or by a UE relaying synchronization information from another eNB (e.g., see UEs 306, 308 of FIG. 3 that are within a different cell coverage area than UEs 302, 308). The second condition may include that at least one of the detected D2DSS(s) is not synchronized to the UE-camped network (e.g., timing difference between detected DSDSS and eNB 110 is larger than a predefined threshold). The idea is to avoid the situation that an in-coverage UE 402 becomes a synchronization source when the detected D2DSS transmitted by out-of-coverage UE 406 is already synchronized to the camped eNB 110 due to other in-coverage synchronization signal multi-hop forwarding. The third condition is that the in-coverage UE 402, which is in an RRC_Connected mode, is not already configured as a synchronization source.

In a second alternative, one or more of the above sub-conditions of the first alternative may be required and an additional requirement may also be included. In the second alternative, the additional requirement may include that a measurement result for the serving cell (i.e., eNB 110) is less than or equal to a threshold parameter, such as a serving cell signal strength threshold. For example, an RSRP value of a cell specific reference signal (CRS) or signal strength of a PSS or SSS may need to be less than the parameter. In one embodiment, the threshold value may be configured to limit selection of the in-coverage UE 402 as a synchronization source when the in-coverage UE 402 is near a network border but still within network coverage. In one embodiment, the threshold parameter may include an RSRP threshold that may be configured by SIB. For example, the threshold parameter may be configured with of a plurality of available values. Example values may include values from the set {−infinity, −115, −110, . . . , −60, +infinity} Decibel-milliwatts (dBm), wherein the values between −115 and −60 dBm are incremented by 5 dBm.

According to one embodiment, for an in-coverage UE 402 instructed by eNB as a D2D synchronization source through dedicated RRC message, in each subframe in the D2DSS resource, the UE shall transmit D2DSS if the subframe does not conflict with cellular transmission from the in-coverage UE 402 perspective regardless of transmitting scheduling assignment or D2D data. Alternatively, for an in-coverage UE 402 who becomes a D2D synchronization source, if the eNB has not instructed it by dedicated signaling to act as synchronization source, the UE shall transmit D2DSS if the subframe does not conflict with cellular transmission from the in-coverage UE 402 perspective and UE is transmitting scheduling assignment or D2D data within the scheduling assignment or D2D data period. Other conditions may also be required, such as whether the in-coverage UE 402 has a proper capability. Additional requirements may include that the subframe is within the scheduling assignment or D2D data period in which scheduling assignment or data is transmitted. An additional requirement may include that the in-coverage UE 402 is in RRC_Connected mode and/or that the UE is not transmitting scheduling assignment or D2D data within the same time period as the D2D SS.

In a third alternative, one or more of the above sub-conditions of the first and second alternatives may be required, in addition to yet another additional requirement. Specifically, the second alternative may require that a signal strength of the detected D2DSS be at least greater than or equal to a threshold value. For example, the RSRP or reference signal received quality (RSRQ) for at least one detected D2DSS from UEs in/outside network coverage or inter-cell UEs must be required to exceed a peer signal quality or peer signal strength threshold.

In one embodiment, the scanning configuration information may include one or more sub-conditions for when the in-coverage UE 402 should scan for synchronization sources. For example, depending on network settings, the in-coverage UE 402 may trigger a scanning procedure when all or some of the predefined or eNB 110 configured sub-conditions are satisfied. For example, one or more of the sub-conditions of the above alternatives may need to be satisfied before scanning, such as that a measured RSRP value for a signal from the eNB 110 exceeds a cell strength threshold. In one embodiment, an entering condition must be met for a duration corresponding to a "timeToTrigger" parameter configured by eNB 110 in order for the event to be triggered. In one embodiment, the in-coverage UE 402 scales the timeToTrigger parameter depending on its speed.

In one embodiment, the scanning configuration information may indicate a reporting format for reports to be sent to the eNB 110. The reporting formation information may indicate quantities or parameters that the in-coverage UE 402 should include in the scanning report. In one embodiment, the in-coverage UE 402 reports one or more of the following such as synchronization source identity, stratum level, and strength of detected D2DSS signal. According to another embodiment, the reporting format (list of reported parameters and related metrics) may be pre-configured (specified) instead of being configured as part of the scanning configuration Time period 412 includes various operations and methods for enabling a synchronization source. At time period 414, the in-coverage UE 402 performs a synchronization source scanning operation to detect potential D2DSS(s) in the proximity and applies the scanning configuration information from E-UTRAN, as discussed in relation to time period 410 above. For example, the in-coverage UE 402 may detect the out-of-coverage UEs 406. In one embodiment, the scanning configuration information may be preconfigured based on a communication standard, or in any other manner. If the in-coverage UE 402 detects the presence of a synchronization source, it may acquire several information items from the D2DSS including detected synchronization source identity, stratum level, and strength of detected D2DSS signal. The eNB 110 may provide the in-coverage UE 402 with the parameters to simplify scanning performance such as the resources that the in-coverage UE 402 should scan for the presence of D2DSS signals or time intervals during which the scanning should be conducted.

At time period 416 the in-coverage UE 402 transfers scanning results to the E-UTRAN (i.e., eNB 110), including information indicated by the reporting format discussed above in relation to the scanning configuration information. In one embodiment, the report includes a plurality of detected D2DSS arranged in order of decreasing receiving power order, for example, the synchronization cell with strongest D2DSS receiving power may be included first. Moreover, the in-coverage UE 402 may be configured to provide a number of periodic reports after having triggered a scanning report event. For example, this event-triggered periodic report can be achieved by means of parameters "reportAmount" and "reportInterval", which may be pre-configured or configured by the eNB 110 and which specify respectively the number of periodic reports and the time period between them. If event-triggered periodic reporting is configured, the in-coverage UE's 402 count of the number of scanning reports may be reset to zero whenever a new D2DSS meets the entry condition. If the in-coverage UE 402 is configured to perform periodic measurement reporting, the in-coverage UE 402 may start reports immediately when the periodic reporting timer is expired.

At time 418, the eNB 410 enables the in-coverage UE 402 as a synchronization source. In one embodiment, the eNB 110 decides whether the reporting in-coverage UE 402 is selected as a synchronization source according to the scanning result reporting at time 416. For example, the eNB 410 may compare information in the report from the in-coverage UE 402 to other UEs which may have detected one or more of the same synchronization sources and select the UE that is closest or otherwise best situated to communicate with the out-of-synch UE. In one embodiment, the eNB 410 may send dedicated RRC signaling to UE 402 which enables the in-coverage UE 402 as the synchronization source and includes parameters such as transmission power for D2DSS or PD2DSCH. In one embodiment, the parameters may indicate that the in-coverage UE 402 shall transmit D2DSS if the UE is in RRC_Connected mode. In one embodiment, the parameters indicate that the in-coverage UE 402 will have a stratum level higher than a detected out-of-coverage UE 406.

At time 420, the in-coverage UE 402 transmits D2DSS/PD2DSCH periodically to provide a synchronization reference to the out-of-coverage UEs 406 and/or other UEs within a D2D cluster. The in-coverage UE 402 may derive the timing information for the synchronization reference from the eNB 110 and propagate it further. In one embodiment, after the out-of-coverage UEs 406 detect D2DSS from the in-coverage UE 402, the out-of-coverage UEs 406 will synchronize to the in-coverage UE 402 and thereby be synchronized with the eNB 110. In one embodiment, the in-coverage UE 402 may only send D2DSS/PD2DSCH as a synchronization reference when D2D communication is triggered by the upper layer of the in-coverage UE 402. For example, an application layer, RRC layer, or other layer may indicate that D2D communication should take place and then the D2DSS/PD2DSCH may be sent. In one embodiment, triggering transmission of the D2DSS/PD2DSCH based on an upper layer may help to minimize power consumption at the in-coverage UE 402. In one embodiment, the in-coverage UE 402 may send D2DSS/PD2DSCH as a synchronization reference always in each subframe in the D2DSS/PD2DSCH resource that does not conflict with cellular communication from the UE 402 perspective, after it is instructed as a D2D synchronization source by the eNB through dedicated RRC signaling.

Another approach for D2D synchronization is a proactive scheme. In the proactive approach, the network may configure D2D capable UEs to periodically transmit D2DSS signals in order to prevent appearance of the I-SS in the network proximity or coverage holes. For instance, the eNB 110 may pre-allocate periodic synchronization resources and configure all D2D capable UEs to periodically transmit D2DSS signals. Alternatively, the eNB 110 may configure specific conditions that should be met to start autonomous transmission of D2DSS signals. For instance, an RSRP threshold may be pre-configured or signaled by the eNB 110, so that if the received power of the D2DSS (or cell-specific reference signal (CRS) in case of eNB 110) is below threshold, in-coverage UE 402 may autonomously start D2DSS transmission. It should be noted that not only threshold relative to eNB 110 but also relative to other UE synchronization sources can be configured and signaled by the eNB 110.

The E-UTRAN (e.g., eNB 110) may also provide additional parameters for D2DSS configuration, such as a transmission power, wireless resource zones, or the like. In one embodiment, the D2DSS configuration can be broadcast by the eNB 110 on system information (e.g., SIB) so that in-coverage UEs 402 in an RRC_Idle state can still conditionally act as synchronization sources, at least in some circumstances.

In one embodiment, the two following conditions may be considered or evaluated at the in-coverage UE 402 side: in-coverage UE 402 detects any D2DSS originated from out-of-coverage UE 406 (see, e.g., FIG. 2) or other eNBs (see, e.g., FIG. 3), and the measured RSRP or PSS/SSS signal quality from E-UTRAN serving cell (e.g., eNB 110) falls below a configured threshold. In response to detecting these conditions, the in-coverage UE may autonomously become a synchronization source and start forwarding eNB-originated timing by transmitting D2DSS on eNB 110 configured time/frequency resources. Similarly, any of the other conditions defined in the reactive approach illustrated in FIG. 4 may also be considered by the in-coverage UE 402 to decide whether and/or when to autonomously forward timing information. For example, the in-coverage UE 402 may consider information regarding the timing difference between detected D2DSS and a camped eNB 110 and the detected D2DSS signal strength, or the like. In one embodiment, the proactive approach allows UEs that are in an RRC_Idle mode to act as synchronization sources while the reactive approach may not allow the UEs to act as synchronization sources in RRC_Idle mode due to the required communication with the eNB 110.

Figure 5:
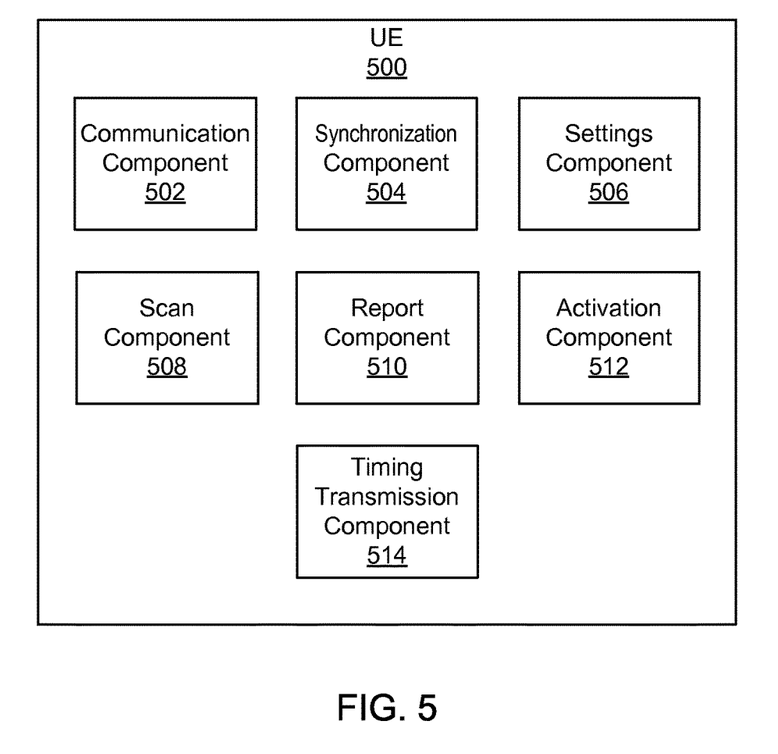
FIG. 5 is a schematic block diagram illustrating components of a wireless communication device, according to one embodiment.

FIG. 5 is a schematic block diagram of a UE 500 configured to operate according to one or more of the reactive approach and proactive approach discussed above. For example, the UE 500 may implement the functionality of the in-coverage UE 402 and/or the out-of-coverage UEs 406 discussed in relation to FIG. 4. The UE 500 includes a communication component 502, a synchronization component 504, a settings component 506, a scan component 508, a report component 510, an activation component 512, and a timing transmission component 514. The components 502-514 are given by way of example only and may not all be included in all embodiments. Each of the components 502-514 may be included in or may be implemented by a UE 500.

The communication component 502 is configured to communicate with a base station and/or one or more peer UEs. For example, the communication component 502 may communicate with an eNB to obtain network services, such as voice services and data services; receive configuration information such as scanning configuration information; or the like. The communication component 502 may also be configured to communicate with one or more D2D enabled UEs for D2D communications and proximity services.

The synchronization component 504 is configured to synchronize with a synchronization source. For example, if the UE 500 is within range of an eNB, the synchronization component 504 may synchronize with the eNB based on timing information received from the eNB. Similarly, if the UE 500 is outside of network coverage, the UE 500 may synchronize with a synchronization source that has a highest detected stratum level, such as another UE or an in-coverage UE.

The settings component 506 is configured to receive scanning configuration information from an eNB 110. The scanning configuration information may include any of the information or settings discussed herein, such as the settings discussed in relation to the reactive or proactive approaches. In one embodiment, the settings component 506 receives scanning configuration information that indicates when the UE 500 should scan for synchronization sources. For example, the settings component 506 may receive a cell signal strength threshold that indicates that the UE 500 is to scan for D2D synchronization sources in response to a signal from the eNB 110 falling below the cell signal strength threshold while the UE 500 remains within coverage of the eNB 110. In one embodiment, the scanning configuration information may indicate one or more resource zones (frequency bands and/or timing) in which to scan for synchronization sources, such as scan for D2DSS or PD2DSCH, that include timing information.

In one embodiment, the scanning configuration information may include one or more reporting requirements. For example, the reporting requirements may indicate when the UE 500 will send a report to the eNB 110 and what information it will include. In one embodiment, the reporting requirements may include one or more reporting triggers. In one embodiment, a reporting requirement may include that a detected D2D synchronization source is not synchronized with the eNB 110. In one embodiment, the reporting requirement may indicate a threshold value for a base station signal strength. In one embodiment, the reporting requirements may indicate that a report should include one or more of an identity of the D2D synchronization source, a stratum level of the D2D synchronization source, and a signal strength of a signal received from the D2D synchronization source. These details may be derived, for example, from a D2DSS during scanning.

The scanning configuration information may also include information on when the UE 500 should autonomously activate itself as a synchronization source. For example, one or more of the above scanning or reporting settings may be used to trigger the transmission of timing information or other synchronization information for receipt for one or more nearby D2D UE. In one embodiment, the scanning configuration information includes D2D zones including periodic time and frequency resources for transmitting peer synchronization signals comprising the timing information.

The scan component 508 is configured to scan for D2D synchronization sources. For example, the scan component 508 may scan for peer synchronization sources that are out of synch with the UE 500 based on scanning configuration information which has been preconfigured and/or received from an eNB 110. In one embodiment, the scan component 508 is configured to scan for D2D synchronization sources when in response to a signal from the eNB 101 (e.g., based on an RSRP or RSRQ) falling below a cell signal strength threshold or cell quality threshold.

The report component 510 is configured to report detection of out-of-synch synchronization sources to an eNB 110. In one embodiment, the report component 510 reports to the eNB 110 based on reporting requirements received in scanning configuration information received from the eNB 110. For example, the report component 510 may evaluate one or more report triggering conditions and report to the eNB 110 when those conditions are met. In one embodiment, the report component 510 may include details about a detected D2D synchronization source which may be derived from a detected D2DSS or PD2DSCH. For example, the report may include one or more of an identity of the synchronization source, a stratum level of the synchronization source, and a signal strength or signal quality of a signal received from the synchronization source.

The activation component 512 is configured to activate the UE 500 as a D2D synchronization source. In one embodiment, the activation component 512 activates the UE 500 as a synchronization source in response to receiving a signal from the eNB 110 enabling the UE 500 as a synchronization source. In one embodiment, the signal from the eNB 110 may include one or more details for the UE 500 including a stratum level (such as a stratum level higher than a detected synchronization source), a transmission power for timing information, a timing for sending timing information, and/or frequency resources on which timing information should be sent.

In one embodiment, the activation component 512 activates the UE 500 as a synchronization source autonomously. For example, the activation component 512 may evaluate one or more trigger conditions to determine when the UE 500 should begin forwarding timing information in a D2DSS or PD2DSCH. In one embodiment, the trigger conditions may be received from the eNB 110 or may be stored by the UE 500 based on a communication standard, such as 3GPP LTE. Example trigger conditions may include that a signal from the eNB 110 is below a cell signal strength threshold, that an out-of-synch UE has been detected, or the like. In one embodiment, the activation component 512 is configured to autonomously activate the UE 500 as a synchronization source while the UE is in an idle mode, such as RRC_Idle.

The timing transmission component 514 is configured to transmit signals to provide a synchronization reference. In one embodiment, the timing transmission component 514 causes the UE 500 to transmit D2DSS or a physical device-to-device shared channel signal (PDSCH) that includes timing information derived from the eNB 110. The transmitted signals may service as a synchronization reference to one or more UEs that are within range of the UE 500. In one embodiment, the timing transmission component 514 forwards timing information originating from the eNB 110 using a peer synchronization signal in response to the activation component autonomously activating the wireless communication device as a synchronization source. In one embodiment, the timing transmission component 514 may forward timing information when the UE 505 is in an RRC_Idle mode. In one embodiment, the timing transmission component 514 transmits timing information in response to a trigger by an upper layer of the UE 5005.

Figure 6:
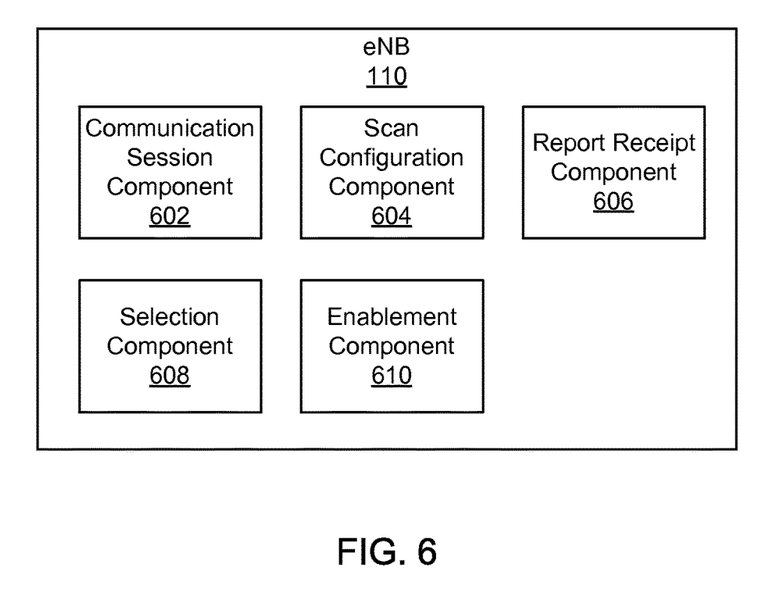
FIG. 6 is a schematic block diagram illustrating components of a base station, according to one embodiment.

FIG. 6 is a schematic block diagram of an eNB 110 configured to operate according to one or more of the reactive approach and proactive approach discussed above. For example, the eNB 110 may implement the functionality of the eNB 110 of FIG. 4. The eNB 110 includes a communication session component 602, a scan configuration component 604, a report receipt component 606, a selection component 608, and an enablement component 610. The components 602-610 are given by way of example only and may not all be included in all embodiments. Each of the components 602-610 may be included in or may be implemented by an eNB 110.

The communication session component 602 is configured to communicate with one or more UEs and establish communication sessions with the one or more UEs. For example, the communication session component 602 may be able to communicate with UEs that are within range of the eNB 110 to establish and maintain a communication session. In one embodiment, the communication session component 602 may provide reference signals or other timing information to synchronize with a UE while establishing a connection or communication session with the UE.

The scan configuration component 604 may provide scanning configuration information to one or more UEs that are within range of the eNB 110. For example, scan configuration component 604 may provide any of the scanning configuration information discussed herein, such as scanning configuration information discussed above in relation to the settings component 506.

The report receipt component 606 is configured to receive a scanning report from the UE 500, such as a report provided by the report component 510. In one embodiment, the report may include any of the report information discussed herein such as an identity, a signal strength, or a stratum level of a synchronization source detected by the UE 500. In one embodiment, the report receipt component 606 is configured to receive a plurality of reports from a plurality of different UEs.

The selection component 608 determines whether to select a UE as a synchronization source. For example, the selection component 608 may determine whether to select the UE 500 after a report is received from the UE 500. The selection component may select one of a plurality of UEs which have sent a scanning report that identifies the same one or more out-of-synch synchronization sources. For example, the selection component 608 may select a UE that has the best signal strength for the particular synchronization source(s).

The enablement component 610 sends a signal to a UE to enable it as a synchronization source. For example, the enablement component 610 may send a message that enables the UE 500 as a synchronization source. The enablement component 610 may provide one or more synchronization details to the selected UE including one or more of a stratum level, transmission power, or other information in order to provide synchronization information to nearby D2D devices.

Figure 7:
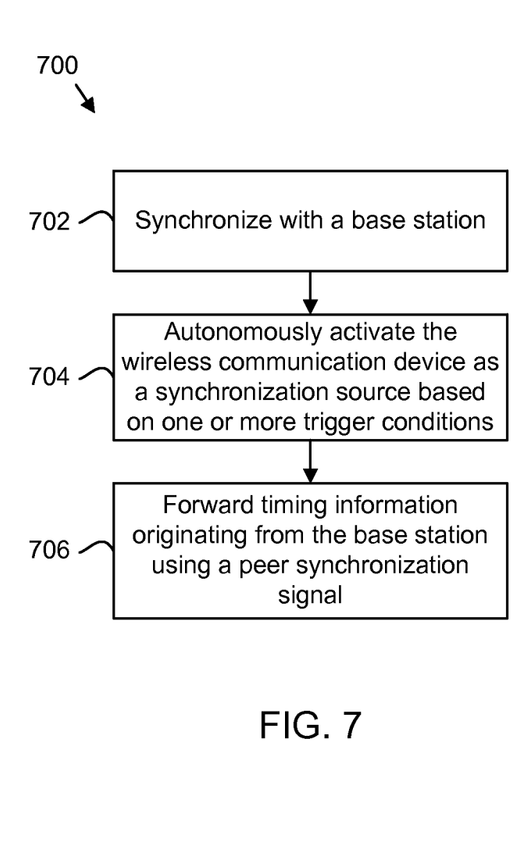
FIG. 7 is a schematic flow chart diagram illustrating a method for D2D synchronization according to a proactive approach, according to one embodiment.

FIG. 7 is a schematic flow chart diagram illustrating an example method 700 for D2D synchronization. The method 700 may be performed by a wireless communication device, such as the UE 500 of FIG. 5.

The method 700 begins and a synchronization component 504 is configured to synchronize 702 with a base station, such as the eNB 110. For example, the wireless communication device may synchronize 702 upon connection to the base station and/or establishing a communication session with the base station.

An activation component 512 autonomously activates 704 the wireless communication device as a synchronization source based on one or more trigger conditions. The trigger conditions may include any of the conditions discussed above in relation to the scanning configuration information or the proactive approach. In one embodiment, the trigger conditions are received from the base station. In another embodiment, the trigger conditions are preconfigured at the wireless communication device based on a communication standard.

The timing transmission component 514 forwards 706 timing information originating from the base station using a peer synchronization signal. In one embodiment, the timing transmission component 514 forwards 706 the timing information in response to the activation component 512 autonomously activating 704 the wireless communication device as a synchronization source. The timing transmission component 514 may send a D2DSS or PD2DSCH that includes the timing information. In one embodiment, one or more of autonomously activating 704 and forwarding 706 may occur while the wireless communication device remains in an idle mode.

Figure 8:
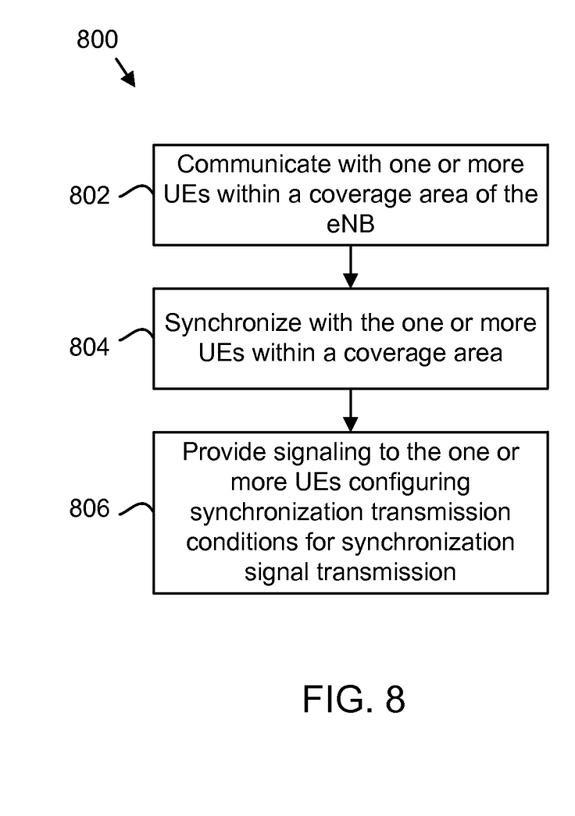
FIG. 8 is a schematic flow chart diagram illustrating another method for D2D synchronization according to a proactive approach, according to one embodiment.

FIG. 8 is a schematic flow chart diagram illustrating an example method 800 for D2D synchronization. The method 800 may be performed by a base station, such as the eNB 110 of FIG. 6.

The method 800 begins and a communication session component 602 communicates 802 with one or more UEs within a coverage area of the eNB 110 and the communication session component 602 synchronizes 804 with one or more UEs. For example, the communication session component 602 may send one or more signals with timing information as a synchronization reference for the UEs.

A scan configuration component 604 provides 806 signaling to the one or more UEs to configure synchronization transmission conditions for synchronization signal transmission. For example, the scan configuration information may include any of the scanning requirements, reporting requirements, requirements for activation, or any other of the scanning configuration information discussed herein. In one embodiment, the synchronization transmission conditions specify when the one or more UEs within the coverage area of the eNB should autonomously send synchronization signals. The UEs may then autonomously evaluate the synchronization transmission conditions to determine when to activate themselves as synchronization sources and forward timing information.

Figure 9:
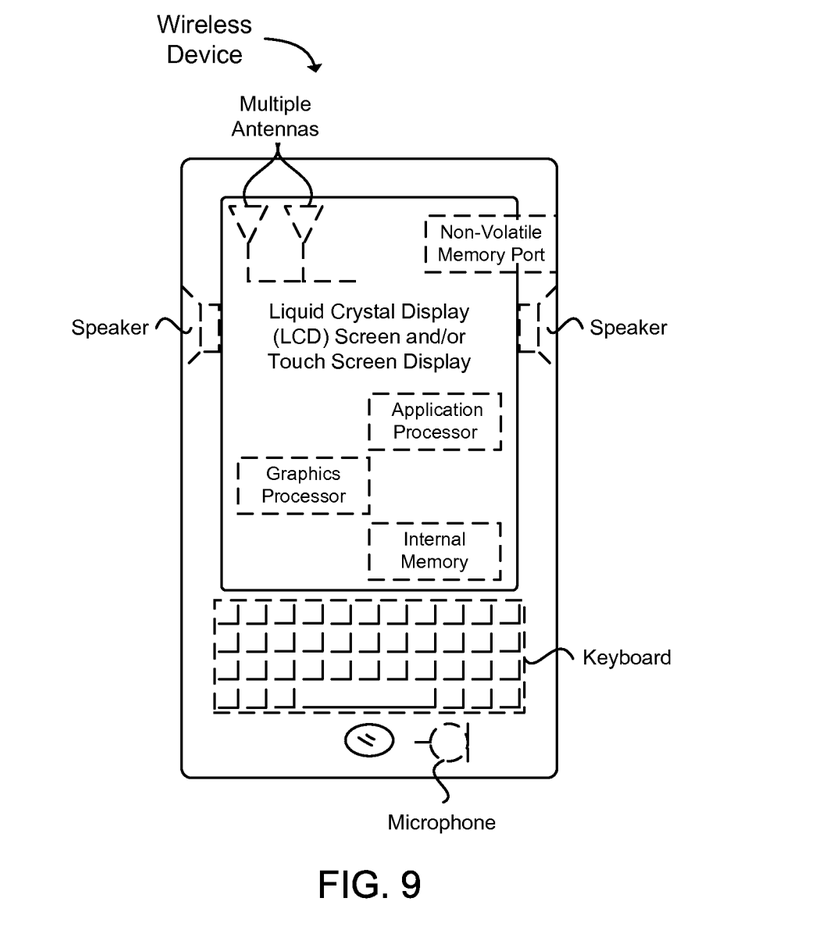
FIG. 9 illustrates a diagram of a wireless device (e.g., UE) in accordance with an example.

FIG. 9 provides an example illustration of a mobile device, such as a UE, a mobile station (MS), a mobile wireless device, a mobile communication device, a tablet, a handset, or another type of mobile wireless device. The mobile device may include one or more antennas configured to communicate with a node, macro node, low power node (LPN), or transmission station, such as a base station (BS), an eNB, a base band unit (BBU), a remote radio head (RRH), a remote radio equipment (RRE), a relay station (RS), radio equipment (RE), or another type of wireless wide area network (WWAN) AP. The mobile device may be configured to communicate using at least one wireless communication standard, including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a WLAN, a wireless personal area network (WPAN), and/or a WWAN.

FIG. 9 also provides an illustration of a microphone and one or more speakers that may be used for audio input and output from the mobile device. The display screen may be a liquid crystal display (LCD) screen or other type of display screen, such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.
Example 1 is a UE that is configured to perform a cell search and synchronize with a first eNB. The UE is configured to camp on a first serving cell corresponding to the first eNB. The UE is configured to acquire D2D information relevant to D2D synchronization information transmission, wherein the UE receives the information relevant to D2D synchronization information transmission in one or more of a system information message and a dedicated D2D configuration information message transmitted by the first eNB. The UE is configured to transmit D2D synchronization information to provide a synchronization reference to one or more D2D UEs that are out-of-coverage of the first eNB in response to one or more trigger conditions. The one or more trigger conditions are based on a RRC state of the UE.

In Example 2, the UE of Example 1 is configured to receives the information relevant to D2D synchronization information transmission in the dedicated D2D configuration information message. The information relevant to D2D synchronization information transmission includes information regarding resources available for D2D synchronization and a first threshold value. The UE is configured to transmit the D2D synchronization information in the resources available for D2D synchronization in response to a measured signal quality or signal strength for the first eNB falling below the first threshold.

In Example 3, the UE of any of Examples 1-2 receives the information relevant to D2D synchronization information transmission in the dedicated D2D configuration information message. The information relevant to D2D synchronization information transmission includes a first indicator to configure whether the UE is allowed to transmit D2D synchronization information while within coverage of the first eNB.

In Example 4, the RRC state of the UE in any of Examples 1-3 includes one of an RRC_IDLE state and an RRC_CONNECTED state.

In Example 5, the UE of any of Examples 1-4 is configured to start transmitting D2D synchronization information in response to the UE being in the RRC_CONNECTED state and the first indicator including a value instructing the UE to start transmitting the D2D synchronization information.

In Example 6, the UE of any of Examples 1-4 is further configured to send one or more measurement reports based on reporting criteria configured by the first eNB, wherein the first eNB sets a value of the first indicator in response to the one or more measurement reports.

In Example 7, the UE of any of Examples 1-6 is further configured to perform measurements for evaluating the reporting criteria based on scanning configuration information.

In Example 8, the UE of any of Examples 1-7 is configured to send the one or more measurement reports based on reporting criteria including (1) detecting at least one D2DSS from the one or more D2D UEs that are out-of-coverage of the first eNB, (2) determining that the at least one D2DSS is not synchronized with the first eNB, and (3) the UE is in the RRC_CONNECTED state and has not be configured to start transmitting D2D synchronization information.

In Example 9, the reporting criteria in Example 8 further includes sending one or more measurement reports if (1) a second threshold is not currently configured and (2) a measurement result of one or more of a RSRP, a strength of PSS, and a strength of a SSS of the first eNB is below a value of the first threshold.

In Example 10, the information relevant for operation of D2D synchronization information transmission provided by dedicated D2D configuration information message of Example 8 further includes a second threshold and wherein the reporting criteria further includes sending one or more measurement reports if a measurement result of one or more of a RSRP, a strength of a PSS, and a signal strength of a SSS of the first eNB is below a value of the second threshold.

In Example 11, the reporting criteria of Example 10 further includes a signal strength of the at least one detected D2DSS exceeds a third threshold configured by the first eNB.

In Example 12, the one or more measurement reports of any of Examples 6-11 include one or more of an identity of the one or more D2D UEs that sent the D2DSS, a stratum level of the one or more D2D UEs that sent the D2DSS, and a signal strength of the D2DSS.

In Example 13, the one or more trigger conditions for when the UE is in an RRC_CONNECTED state in any of Examples 1-12 include that the UE is not configured with a value for a first indicator indicating that the UE is allowed to transmit the D2D synchronization information, the UE is capable of transmitting the D2D synchronization information, the UE receives a first threshold in the system information message, and a RSRP measurement of the first eNB is below the first threshold.

In Example 14, the one or more trigger conditions for when the UE is in an RRC_IDLE state in any of Examples 1-13 include the UE is capable of transmitting D2D synchronization information, the UE receives a first threshold in the system information message, and a RSRP measurement of the first eNB is below the first threshold.

In Example 15, transmitting the D2D synchronization information to provide a synchronization reference in any of Examples 1-14 includes transmitting in response to a D2D data communication trigger by an upper layer of the UE.

In Example 16, transmitting the D2D synchronization information to provide the synchronization reference in any of Examples 1-15 includes transmitting one or more of a D2DSS and a PD2DSCH.

Example 17 is a base station that includes a communication session component, a report receipt component, and an enablement component. The communication session component is configured to synchronize with one or more in-range wireless communication devices including a first wireless communication device. The report receipt component is configured to receive a report from the first wireless communication device indicating detection of an out-of-synch wireless communication device. The enablement component is configured to send a signal to the first wireless communication device configuring the first wireless communication device as a synchronization source with a higher stratum level than the out-of-synch wireless communication device.

In Example 18, the report receipt component of Example 17 is configured to receive one or more additional reports from one or more additional wireless communication devices of the one or more in-range wireless communication devices.

In Example 19, the base station of any of Examples 17-18 further includes a selection component configured to determine whether to select the first wireless communication device as a synchronization source. The enablement component is configured to send the signal configuring the first wireless communication device as a synchronization source in response to determining to select the first wireless communication device as the synchronization source.

In Example 20, the base station of any of Examples 17-19 further includes a scan configuration component configured to provide scanning configuration information to the one or more in-range wireless communication devices.

In example 21, the scanning configuration information in any of Examples 17-20 includes one or more reporting requirements indicating when to send a report to the base station. The one or more reporting requirements including one or more of a requirement that a received synchronization signal is not synchronized with the base station and a requirement that a received synchronization signal is greater than a signal strength threshold.

In Example 22, the scanning configuration information in any of Examples 17-21 includes a requirement that the one or more in-range wireless communication devices scan for synchronization signals in response to a signal from the base station falling below a cell signal strength threshold.

Example 23 is a UE configured to scan for device-to-device synchronization sources based on scanning configuration information. The UE is configured to report detection of a device-to-device synchronization source to an eNB in response to determining that the device-to-device synchronization source meets one or more reporting requirements of the scanning configuration information. The UE is configured to receive a communication from the eNB enabling the UE as a synchronization source and transmit signals to provide a synchronization reference to one or more in-range UEs including the device-to-device synchronization source.

In Example 24, the UE of Example 23 is further configured to receive the scanning configuration information from the eNB, the scanning configuration information including the one or more reporting requirements.

In Example 25, the UE of any of Examples 23-24 is further configured to synchronize with the eNB.

In Example 26, determining that the device-to-device synchronization source meets the one or more reporting requirements in any of Examples 23-25 includes determining that the device-to-device synchronization source is not synchronized with the eNB.

In Example 27, the scanning configuration information in any of Examples 23-26 includes a cell signal strength threshold. The UE is configured to scan for device-to-device synchronization sources in response to a signal from the eNB falling below the cell signal strength threshold.

In Example 28, reporting the detection of the device-to-device synchronization source in any of Examples 23-27 includes reporting one or more of an identity of the device-to-device synchronization source, a stratum level of the device-to-device synchronization source, and a signal strength of a signal received from the device-to-device synchronization source.

In Example 29, transmitting the signals to provide a synchronization reference in any of Examples 22-28 includes transmitting in response to a trigger by an upper layer of the UE.

In Example 30, transmitting the signals to provide the synchronization reference in any of Examples 23-29 includes transmitting one or more of a device-to-device synchronization signal and a PDSCH.

Example 31 is a wireless communication device that includes a synchronization component, an activation component, and a timing transmission component. The synchronization component is configured to synchronize with a base station. The activation component is configured to autonomously activate the wireless communication device as a synchronization source based on one or more trigger conditions. The timing transmission component is configured to forward timing information originating from the base station using a peer synchronization signal in response to the activation component autonomously activating the wireless communication device as a synchronization source.

In Example 32, the wireless communication device of Example 31 further includes a scan component configured to scan for out-of-synchronization peer wireless communication devices.

In Example 33, the one or more trigger conditions in any of Examples 31-32 include detection of an out-of-synchronization peer wireless communication device.

In Example 34, the one or more trigger conditions in any of Examples 31-33 include a base station signal strength threshold. The activation component is configured to autonomously activate the wireless communication device in response to measuring a signal strength of a signal from the base station less than the base station signal strength threshold.

In Example 35, the wireless communication device of any of Examples 31-34 further includes a settings component configured to receive the one or more trigger conditions from the base station.

In Example 36, the wireless communication device of any of Examples 31-35 further includes a settings component configured to receive a signal from the base station allocating periodic time and frequency resources for transmitting the peer synchronization signals including the timing information.

In Example 37, wherein one or more of the activation component of any of Examples 31-36 is configured to autonomously activate the wireless communication device as a synchronization source while the wireless communication devices is in an idle mode and the timing transmission component of any of Examples 31-36 is configured to forward timing information while the wireless communication device is in an idle mode.

Example 38 is an eNB configured to communicate with one or more UE within a coverage area of the eNB. The eNB is configured to synchronize with one or more UEs within a coverage area. The eNB is configured to provide signaling to the one or more UEs of configuring synchronization transmission conditions for synchronization signal transmission. The synchronization transmission conditions specify when the one or more UEs within the coverage area of the eNB should autonomously send synchronization signals.

In Example 39, the synchronization transmission conditions of Example 38 include one or more of (1) a cell signal quality threshold, wherein the signal quality threshold indicates that the one or more UEs within the coverage area should autonomously send synchronization signals when a signal quality for the eNB falls below the cell signal quality threshold and (2) a signal quality of an out-of-synch UE.

In Example 40, the eNB of any of Examples 38-39 is further configured to transmit a signal to the one or more UEs within a coverage area allocating periodic synchronization resources for all of the one or more UEs to periodically transmit synchronization signals.

Example 41 is a method that includes performing, on a UE, a cell search and synchronize with a first eNB, wherein the UE is configured to camp on a first serving cell corresponding to the first eNB. The method includes acquiring D2D information relevant to D2D synchronization information transmission, wherein the UE receives the information relevant to D2D synchronization information transmission in one or more of a system information message and a dedicated D2D configuration information message transmitted by the first eNB. The method includes transmitting D2D synchronization information to provide a synchronization reference to one or more D2D UEs that are out-of-coverage of the first eNB in response to one or more trigger conditions. The one or more trigger conditions are based on a RRC state of the UE.

In Example 42, receiving the information relevant to D2D synchronization information transmission in Example 41 includes receiving in the dedicated D2D configuration information message. The information relevant to D2D synchronization information transmission includes information regarding resources available for D2D synchronization and a first threshold value. The UE is configured to transmit the D2D synchronization information in the resources available for D2D synchronization in response to a measured signal quality or signal strength for the first eNB falling below the first threshold.

In Example 43, receiving the information relevant to D2D synchronization information transmission in any of Examples 41-42 include receiving in the dedicated D2D configuration information message. The information relevant to D2D synchronization information transmission includes a first indicator to configure whether the UE is allowed to transmit D2D synchronization information while within coverage of the first eNB.

In Example 44, the RRC state of the UE in Example 43 includes one of an RRC_IDLE state and an RRC_CONNECTED state.

In Example 45, the method of Example 44 further includes start transmitting D2D synchronization information in response to the UE being in the RRC_CONNECTED state, and the first indicator including a value instructing the UE to start transmitting the D2D synchronization information.

In Example 46, the method of Example 45 further includes sending one or more measurement reports based on reporting criteria configured by the first eNB, wherein the first eNB sets a value of the first indicator in response to the one or more measurement reports.

In Example 47, the method of Example 46 further includes performing measurements for evaluating the reporting criteria based on scanning configuration information.

In Example 48, sending the one or more measurement reports in any of Examples 43-47 includes sending based on reporting criteria including detecting at least one D2DSS from the one or more D2D UEs that are out-of-coverage of the first eNB, determining that the at least one D2DSS is not synchronized with the first eNB, and the UE is in the RRC_CONNECTED state and has not be configured to start transmitting D2D synchronization information.

In Example 49, the reporting criteria in any of Examples 43-47 further includes sending one or more measurement reports if a second threshold is not currently configured and a measurement result of one or more of a RSRP, a strength of a PSS, and a strength of a SSS of the first eNB is below a value of the first threshold.

In Example 50, the information relevant for operation of D2D synchronization information transmission provided by dedicated D2D configuration information message in any of Examples 43-49 further includes a second threshold and wherein the reporting criteria further includes sending one or more measurement reports if a measurement result of one or more of a RSRP, a strength of a PSS, and a signal strength of a SSS of the first eNB is below a value of the second threshold.

In Example 51, the reporting criteria in any of Examples 43-49 further includes a signal strength of the at least one detected D2DSS exceeds a third threshold configured by the first eNB.

In Example 52, the one or more measurement reports of any of Examples 46-51 include one or more of an identity of the one or more D2D UEs that sent the D2DSS, a stratum level of the one or more D2D UEs that sent the D2DSS, and a signal strength of the D2DSS.

In Example 53, the one or more trigger conditions for when the UE is in an RRC_CONNECTED state in any of Examples 41-52 include the UE is not configured with a value for a first indicator indicating that the UE is allowed to transmit the D2D synchronization information, the UE is capable of transmitting the D2D synchronization information, the UE receives a first threshold in the system information message, and a RSRP measurement of the first eNB is below the first threshold.

In Example 54, the one or more trigger conditions for when the UE is in an RRC_IDLE state include in any of Examples 41-42 include that the UE is capable of transmitting D2D synchronization information, the UE receives a first threshold in the system information message, and a RSRP measurement of the first eNB is below the first threshold.

In Example 55, transmitting D2D synchronization information to provide a synchronization reference in any of Examples 41-54 includes transmitting in response to a D2D data communication trigger by an upper layer of the UE.

In Example 56, transmitting the D2D synchronization information to provide the synchronization reference in any of Examples 41-55 includes transmitting one or more of a D2DSS and a PD2DSCH.

Example 57 is an apparatus including means to perform a method of any of Examples 41-56.

Example 58 is a machine readable storage including machine-readable instructions, when executed, to implement a method or realize an apparatus of any of Examples 41-57.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An apparatus for use in user equipment (UE), comprising:
measurement logic, at least a portion of which comprises circuitry, to determine a reference signal received power (RSRP) measurement of a signal received from a cell of an evolved universal terrestrial radio access network (E-UTRAN); and
processing logic, at least a portion of which comprises circuitry, to:
determine that the UE is in coverage of the cell of the E-UTRAN based on the RSRP; and
configure the UE to transmit a direct link synchronization signal (SS) using a PC5 interface for discovery or communication in either a radio resource configuration (RRC) connected state or an RRC idle state, wherein to configure the UE, the processing logic is configured to:
decode a system information block (SIB) message from the E-UTRAN to determine a signal strength threshold for determining whether to generate the direct link SS, the signal strength threshold being between −115 dbM and −60 dbM;
compare the RSRP measurement to the signal strength threshold; and
in response to a determination that the RSRP measurement is below the signal strength threshold, generate synchronization information for the direct link SS for transmission using the PC5 interface.

2. The apparatus of claim 1, wherein to configure the UE to transmit the direct link SS, the processing logic is configured to autonomously activate the UE as a synchronization source without being configured by dedicated signaling from the E-UTRAN to transmit synchronization information.

3. The apparatus of claim 2, wherein to autonomously activate the UE as a synchronization source, the processing logic is to configure the UE to periodically transmit at least one of the direct link SS and a direct link information message.

4. The apparatus of claim 1, wherein the processing logic is configured to derive synchronization information for the direct link SS from information or signals received from at least one of the E-UTRAN and a peer UE acting as a synchronization reference.

5. The apparatus of claim 1, wherein the processing logic is further to:
determine that the UE is in coverage on a frequency used for direct link discovery; and
configure the UE to transmit the direct link SS in a subframe on the frequency used for direct link discovery.

6. The apparatus of claim 5, wherein the processing logic is further to:
generate a direct link information message comprising configuration parameters for direct link communication; and
configure the UE to transmit the direct link information message on the frequency used for direct link discovery in the same subframe as the direct link SS.

7. The apparatus of claim 5, wherein the processing logic is further to select the subframe based on a determination that the subframe is not used by the UE for uplink transmission.

8. The apparatus of claim 1, wherein the processing logic is further to:
determine that the UE is in coverage on a frequency used for direct link communication;
configure the UE to transmit the direct link SS in a subframe on the frequency used for direct link communication;
generate a direct link information message comprising configuration parameters for direct link communication; and
configure the UE to transmit the direct link information message on the frequency used for direct link communication in the same subframe as the direct link SS.

9. The apparatus of claim 8, wherein the processing logic is further to select the subframe within the same time period in which the UE is configured to transmit direct link control information.

10. An apparatus for use in user equipment (UE), comprising:
a transceiver to communicate with an evolved universal terrestrial radio access network (E-UTRAN) node B (eNB); and
one or more processors coupled to the transceiver to:
perform a cell search and synchronize with a serving eNB, wherein the UE is configured to camp on a serving cell corresponding to the serving eNB and to receive, from the serving eNB through the transceiver, a threshold value for determining whether to generate the direct link synchronization information, the threshold value being between −115 dbM and −60 dbM;
derive direct link synchronization information from one or more of a system information message and a dedicated direct link configuration information message received through the transceiver from the serving eNB;
configure the UE to transmit, through the transceiver, the direct link synchronization information in a synchronization reference signal to one or more direct communication UEs that are out-of-coverage of the serving eNB in response to any of at least two trigger conditions comprising:
a network based trigger condition wherein the UE is in a radio resource configuration (RRC) connected state, the UE is in coverage of the cell of the E-UTRAN, and is configured to transmit the direct link synchronization information by dedicated signaling from the serving eNB; and
a UE based trigger condition wherein the UE is in either an RRC connected state or an RRC idle state, and wherein a reference signal received power (RSRP) of the serving eNB is below the threshold value, the second trigger condition causing the UE to generate the direct link synchronization information.

11. The apparatus of claim 10, wherein the direct link synchronization information is included in the system information message, wherein the direct link synchronization information comprises information regarding resources available for direct link synchronization information transmission, direct link synchronization information reception, and the threshold value, wherein the one or more processors configure the UE to transmit the direct link synchronization information in the resources used for direct link synchronization information transmission in response to any one of the at least two trigger conditions.

12. The apparatus of claim 10, wherein the one or more processors are further configured to generate one or more measurement reports based on reporting criteria configured by the serving eNB.

13. The apparatus of claim 12, wherein the UE is further configured to perform measurements for evaluating the reporting criteria based on scanning configuration information.

14. The apparatus of claim 12, wherein the one or more measurement reports comprise one or more of:
an identity of the one or more direct communication UEs that sent the direct link synchronization signal,
a stratum level of the one or more direct communication UEs that sent the direct link synchronization signal, and
a signal strength of the direct link synchronization signal.

15. The apparatus of claim 10, wherein to generate the direct link synchronization information to provide a synchronization reference is in response to a direct link data communication trigger by an upper layer of the UE.

16. The apparatus of claim 10, wherein the one or more processors further configure the UE to transmit the direct link synchronization information to provide the synchronization reference by transmission of at least one of a direct link synchronization and a direct link information message comprising configuration parameters for direct link communication.

17. A non-transitory machine readable storage medium including machine-readable instructions, when executed by one or more processors of a first user equipment (UE), to:
derive synchronization information from information or signals received from at least one of an evolved universal terrestrial radio access network (E-UTRAN) and a second UE acting as a synchronization reference;
in response to a system information block (SIB) message including a signal strength threshold value for determining whether to become a synchronization source for UE to UE direct communication, when the first UE is in coverage of the E-UTRAN, determine that a reference signal received power (RSRP) is below the signal strength threshold value, the signal strength threshold being between −115 dbM and −60 dbM; and
in response to the RSRP being below the signal strength threshold value, configure the first UE as the synchronization source for UE to UE direct communication using a PC5 interface.

18. The non-transitory machine readable storage medium of claim 17, the machine-readable instructions further to:
determine that the first UE is in coverage on a frequency used for the UE to UE direct communication discovery; and
configure the first UE to transmit a synchronization signal in a subframe on the frequency used for UE to UE communication discovery.

19. The non-transitory machine readable storage medium of claim 18, the machine-readable instructions further to:
generate an information message comprising configuration parameters for UE to UE direct communication; and
configure the first UE to transmit the information message on the frequency used for UE to UE discovery in the same subframe as the synchronization signal.

20. The non-transitory machine readable storage medium of claim 18, the machine-readable instructions further to select the subframe based on a determination that the subframe is not used by the first UE for uplink transmission.

21. The non-transitory machine readable storage medium of claim 17, the machine-readable instructions is further to:
determine that the first UE is in coverage on a frequency used for UE to UE direct communication;
configure the first UE to transmit a synchronization signal in a subframe on the frequency used for UE to UE direct communication;
generate an information message comprising configuration parameters for the UE to UE direct communication; and
configure the first UE to transmit the information message on the frequency used for the UE to UE direct communication in the same subframe as the synchronization signal.

22. The non-transitory machine readable storage medium of claim 21, the machine-readable instructions further to select the subframe within the same time period in which the first UE is configured to transmit UE to UE control information.

* * * * *